United States Patent Office  2,709,150
Patented May 24, 1955

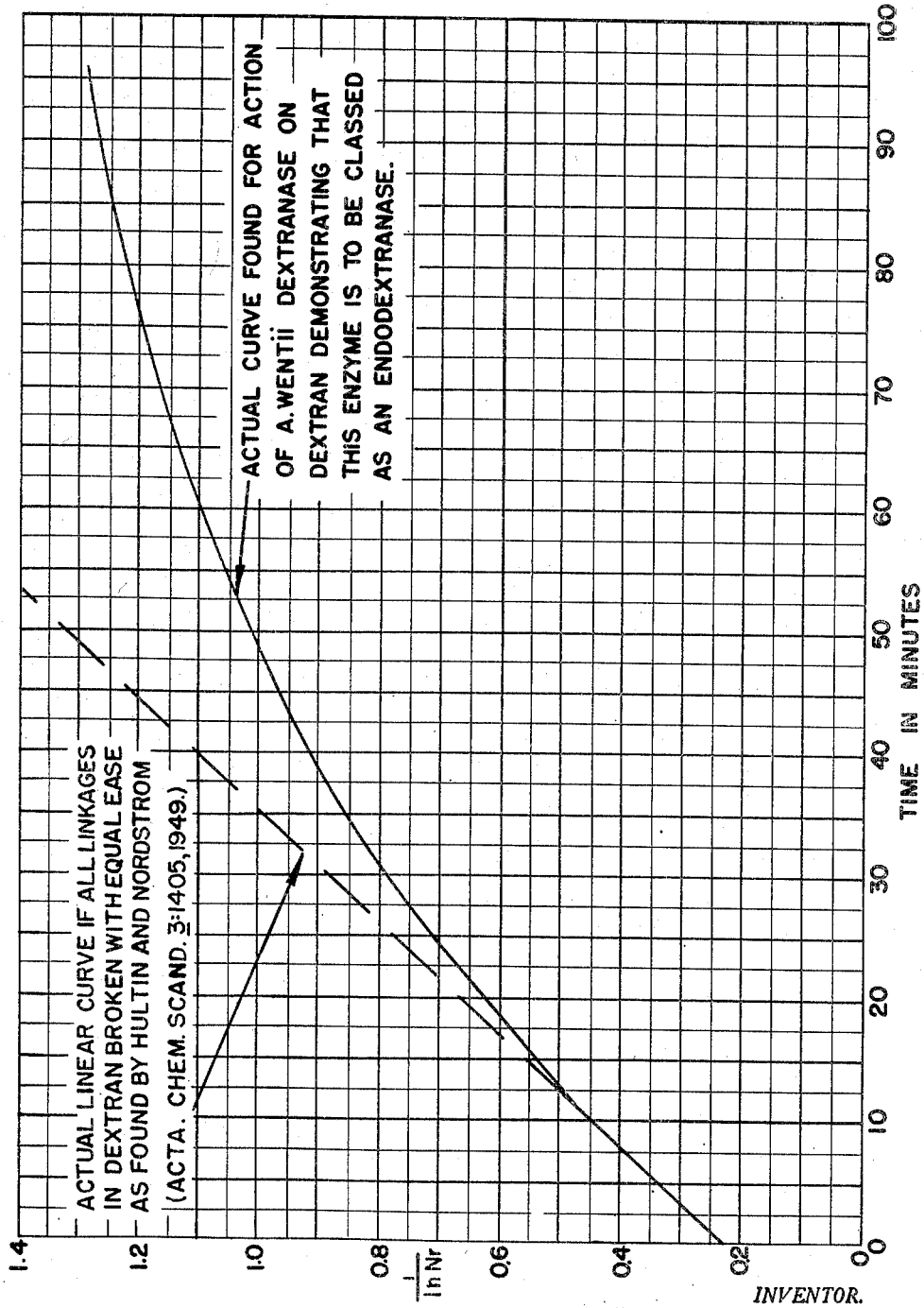

2,709,150

METHOD OF PRODUCING DEXTRAN MATERIAL BY BACTERIOLOGICAL AND ENZYMATIC ACTION

Virginia W. Carlson and Warner W. Carlson, Birmingham, Ala., assignors, by mesne assignments, to Enzmatic Chemicals, Inc., Wilmington, Del., a corporation of Delaware Application August 9, 1951, Serial No. 241,168

13 Claims. (Cl. 195—31)

This invention relates to a method of producing dextran of a desired molecular weight.

In particular it relates to our discovery of the unexpected properties of a strain of *Aspergillus wentii* under the conditions set forth hereinafter when used for a molecular splitting agent in the nature of a limit or endo dextranase.

The state of the art is as follows:

Heretofore the efforts to produce dextran, which is a long chain polymer, in the desired molecular weight range for such uses as anti-shock agents or blood plasma extender have been presented with great difficulty.

The art at this stage prior to the instant invention was forced to rely upon acid hydrolysis with a succession of treatments to successively reduce the molecular weight to the approximate weight range desired. When the approximate result was secured it was still a matter of considerable uncertainty, first, as to the weight, and second, there was uncertainty due to the fact that the dextran was not of any one particular weight but an average of a wide variety of weights. This has led to therapeutic problems because of the uncertainty as to the exact molecular weight or average molecular weight of the dextran when used in a 6% saline solution for intravenous injections as a blood plasma extended. The unsolved problem in the art was for a quick, economical and accurate way of automatically producing the molecular weight range desired. This problem until the instant invention had been made was unsolved although it has been the subject of wide investigation.

The object of the instant invention is to provide such a quick and accurate means for producing dextran of the molecular weight range desired and it is also an object to provide a method by which the molecular weight desired can be secured with certainty and by which the molecular weight can be varied according to the uses for the dextran.

In particular the object of the instant invention is to take advantage of our discovery that *Aspergillus wentii*, when treated and controlled, as set forth hereinafter, becomes a molecular splitting agent which enables us in high yield to split the dextran molecules into fragments of predetermined equal size and to vary that size and vary the number of fragments of equal size at will.

It is a further object to eliminate the usual acid hydrolysis and steam hydrolysis and substitute therefor a controlled enzymatic splitting agent derived from a strain of *Aspergillus wentii*.

Our discovery of a method and of a new material for the practice of the method came about through our extended research in seeking some solution of the foregoing problem. Acid hydrolysis, or steam hydrolysis under pressure, was found to be inaccurate, expensive and time-taking. Enzymes capable of hydrolyzing dextran in any practical fashion were unknown and in fact were distributed very sparsely in nature so far as any enzymes were concerned that might have the possibility of hydrolyzing the dextran. The exception to the foregoing statement up to the time of the discoveries leading to the instant invention was that the only two enzymes found capable of hydrolyzing dextran were subject to the same objections as acid hydrolysis, namely, that they were inaccurate in their action and took a very long time to secure any result and when the result was secured there was uncertainty as to the exact molecular weight or the average of weight varied to such a degree that a standardized product was impossible.

An unexpected factor which we have discovered in the problem was that any enzyme media useful for preparing water solutions of dextran would not be a practical method until nutrient media were further fortified with peptone or other protein hydrolysates. The addition of peptone to our enzyme cultures greatly speeded production of the special enzyme desired. It was essential that such enzymes be capable of attacking the dextran for the purpose of modifying its molecular structure.

We have discovered that *Aspergillus wentii* when cultivated as set forth herein produces an enzyme having the ability to attack the dextran molecule and can be used first to change the molecular weight of the dextran, and second to do so within accurately defined limits which can be varied at will. It will be understood that the mere ability to attack dextran is in itself no proof that a given mold will be useful in forming an enzyme that will change the molecular weight of the dextran and to thereby yield a commercially valuable product. For instance it may either: (*a*) attack the dextran directly and utilize the sugar residues for the formation of fermentation products such as alcohol, lactic acid, etc., or (*b*) hydrolyze the dextran from the ends of chains, liberating the units as free glucose. By comparison, a mold to be useful must produce an enzyme which will hydrolyze the long chain of glucose units (which comprise the dextran molecule) by attacking these chains along their length in such a way as to yield fragments with molecular weights in the designed range. Not only must it produce such an enzyme, but from the practical viewpoint it should form it at a reasonable speed.

It is part of our discovery that our mold may be classified as *Aspergillus wentii*. For purposes of identification, we studied its growth on Czapek sucrose agar, the standard medium used in mold classification work. On this medium our mold produces colonies which grow rapidly, with the aerial mycelium forming dense floccose masses. The growth is cottony white for three or four days, then turns a grey color with an absence of green tones. On further incubation the growth becomes dense and furry in varying shades of grey, slowly deepening and changing to a brown. When the culture is fully developed it is coffee-colored. The reverse of the culture passes through shades of yellow and green, finally becoming distinctly reddish, although small patches of yellow and green may persist. The substratum is transfused with a yellow pigment. Conidial heads are large and coffee-colored when mature, radiate, with only a slight tendency towards splitting. Conidiophore walls are smooth and almost colorless. Vesicles are globose and typically fertile over the entire surface. Sterigmata are typically in two series, bearing chains of conidia which are globose, yellow-brown, roughened and echinulate. Neither perithecia nor sclerotia have been observed.

Because of the community of biochemical characteristics shared by the group, we believe that it may be possible by our methods to adapt various strains of *A. ustus*, *A. candidus*, *A. niger*, *A. tamarii* and *A. flavus-oryzae* to obtain the endo-dextranase that can attack dextran. We do not infer that such ability is readily found, for we have tested commercial diastatic (polysaccharide-splitting) enzyme preparations of the *A. flavus-oryzae* class and have found them totally without effect on dextran. Under our conditions of cultivation and treatment, however, dextranases may be formed by this larger group.

In this specification the term dextranase is employed since it agrees with the standard terminology of enzyme chemistry—the suffix "ase" is added to the name of the substance attacked by the enzyme. We have discovered that the dextranase in this case is based upon *Aspergillus wentii* and its unexpected properties when treated as hereinafter set forth.

We have discovered that the mold is capable of producing an enzyme which in turn is capable of accurately splitting the long chain polymer of the dextran and reduces the molecular weight to the predetermined desired weight range in high yield.

The discovery that this mold elaborates the enzyme with this action was in itself not sufficient for the solution of this problem. By adding new and unusual types of nutrients to the culture medium there was achieved an unexpected rapid development of the enzyme which is able to definitely reduce the molecular size of the dextran polymer with accuracy and within a reasonable length of time. This resulted in first reducing to practical limits the time required to produce the enzyme and second in getting large quantities of enzymes. The third discovery was the fact that very small amounts of the enzyme in great dilution would perform satisfactorily with the requisite speed and accuracy and would produce dextran of the desired molecular weight range.

We have therefore discovered that our method enables us to take molds that were unsatisfactory or substantially inactive or inaccurate in producing dextran of the requisite molecular weight substantially automatically and enables them by our method to split the molecule accurately to a predetermined weight range and do so rapidly so as to make the process commercially feasible and useful.

It will be understood that these examples we give hereinafter are meant to be typical and not exclusive of the mold that would produce the enzyme that would have this satisfactory effect for it is our belief that this method is broadly applicable and provides a new tool of scientific investigation and of industrial application.

The problem that presented itself to us as a result of this discovery was to first identify what mold was having this reaction as it is not uncommon for a variety of molds to be present in such a treatment. We have identified the mold as a strain of *Aspergillus wentii*. The second problem was to determine the mode of action of the mold enzyme so that we could be sure that it was a useful dextranase which hydrolyzed or split the glucose chains of dextran along their length yielding fragments of a suitable molecular size. Heretofore the prior art disclosed dextranases which could split dextran but which caused mainly the appearance of reducing sugar (glucose) indicating that the enzymes were attacking the chain ends. In the instant case the enzyme produced by our method does not do this. In repeated experiments in which an excess of the enzyme has been allowed to act on dextran for extended periods, reducing sugar has been only a minor product.

Another unusual discovery that we have made, and an unexpected result of our method, was the disclosure of the fact that the enzyme so produced by our method, and allowed to act for extended periods of time on various dextrans, did so by reducing them to relatively small molecular sizes, in the range of 20,000 to 40,000, and then had little further action. For this reason we chose to term the enzyme of our discovery as "limit dextranase" meaning that there is a faculty in this enzyme of producing a defined, limited size particle. We further define our enzyme by terming it an endo-dextranase, emphasizing its affinity for glycosidic linkages within the dextran molecules. The opposite kind of enzyme, an exodextranase, is one which has an affinity for glycosidic linkages at the ends of the polysaccharide chains making up the dextran molecule. Such an enzyme, an exodextranase, produces mainly reducing sugar by its attack on dextran, and hence is of no value for the purpose of preparing partially hydrolyzed dextrans as blood volume extenders. From the evidence available in the literature, it appears that the only dextranases known until the instant invention belonged to the class of exodextranases.

By contrast our enzyme, as an endo-dextranase, in an initial rapid reaction attacks the dextran molecule at linkage points remote from end-groups to transform the large molecules into relatively low-molecular weight, low-viscosity products. A secondary, very slow reaction then ensues during which the enzyme slowly attacks these low molecular weight products. This can be made clear by the following example in which a purified, highly potent preparation of our endo-dextranase was added in a dilution of 1:100 to a solution of dextran, and the resulting viscosity changes observed.

| Time after mixing (minutes) | Relative viscosity (compared to water) |
| --- | --- |
| 0 | 7.25 |
| 2 | 4.69 |
| 3.5 | 4.09 |
| 4.5 | 3.77 |
| 6 | [1] 3.62 |
| 7.5 | 3.47 |
| 9 | 3.36 |
| 11.5 | 3.25 |
| 40 | 2.77 |
| 58 | 2.61 |
| 1,498 | [2] 1.77 |
| 2,938 | 1.70 |

[1] 50% reduction in viscosity.
[2] 75% reduction in viscosity.

In the example given, the relative viscosity was reduced to 50 per cent of the original value in only 6 minutes, while an additional 1492 minutes were required to drop the relative viscosity of this intermediate solution by 50 per cent (or to 25 per cent of the original value). Little further change was noted during an additional 1440 minutes. It can be shown mathematically that the results obtained would be impossible if it be supposed that our dextranase attacks all glycosidic linkages in the dextran molecule with the same probability. The results can be explained only by the hypothesis that the end-groups of the polysaccharide chains in the dextran molecule in some manner disturb or hinder the union of dextran with the enzyme and hence decrease the velocity of hydrolysis. By contrast, union of the enzyme with glycosidic linkages remote from end-groups must take place with great ease, resulting in rapid rupture of the large dextran molecule into smaller fragments. When only these smaller fragments remain, the enzyme then attacks them, although only slowly and with difficulty. The manner in which our "limit" endo-dextranase from Aspergilli molds acts on the dextran being hydrolyzed is illustrated graphically in the attached drawing. The graph shown was obtained by allowing our endo-dextranase to act on the dextran to be cleaved for varying time periods and plotting the reciprocal of the relative viscosity $$\frac{1}{\ln N_r}$$

against the action time. As shown, the plot is non-linear and is not the straight line (shown in broken lines) which it would be if our endo-dextranase attacked all of the linkages of the dextran with equal ease. (See Hultin-Nordstrom, Acta, Chem. Scand. 3:1405, 1949.)

A part of our discovery was the observation that the mold producing the aforementioned enzyme was *Aspergillus wentii*.

Our dextranase from *Aspergillus wentii*, when it acts upon dextran, produces reducing sugar only as a minor product.

Briefly our process consists of treating the mold *Aspergillus wentii* as follows:

We first grow the mold for the production of the enzyme in the presence of a nutrient medium whose active ingredients are a combination of dextran-salts-vitamin mixture enriched with a source of amino acids. The dextran just mentioned is not the general mass dextran that later will be hydrolyzed by the action of this enzyme. Our purpose in using the relatively small amount of dextran in the nutrient is to acclimatize the mold and its enzyme so produced to the dextran with which it will be ultimately associated in large quantities. At least, this we find to be an important factor and this is our theory.

A typical medium comprising this nutrient which causes the mold to grow rapidly within a few days to produce a solution rich in dextranase is as follows:

TABLE 1

*Medium PV*

| Component: | | |
|---|---|---|
| Peptone | grams, liter | 5.0 |
| Dextran-salts solution: | | |
| Dextran | do | 10.0 |
| MgSO$_4$ | do | 0.1 |
| NaCl | do | 0.1 |
| FeSO$_4$ | do | 0.01 |
| MnSO$_4$ | do | 0.01 |
| KH$_2$PO$_4$ | do | 0.1 |
| NaOAc | do | 2.0 |
| KoAc | do | 0.5 |
| B-vitamins: | | |
| Nicotinic acid | milligrams, liter | 1.0 |
| Riboflavin | do | 0.5 |
| Thiamine | do | 0.5 |
| Ca pantothenate | do | 0.5 |
| Pyridoxine | do | 0.4 |
| Folic acid | do | 0.01 |
| Biotin | do | 0.001 |

The above medium is very satisfactory from the viewpoint of enzyme production, but probably is more complicated than necessary. Additional examples include: (1) A medium of the composition given in Table 1, with the B vitamins omitted: (2) A medium with the composition given in Table 1 but with the B vitamins replaced by yeast extract, 0.4 gm. per liter; (3) A medium of the composition given in Table 1 but with the peptone replaced by casein hydrolysate 5.0 gm. per liter, either with or without the B vitamins; (4) A medium of the composition given in which the dextran component is varied from 5.0 to 50.0 gm. per liter.

The most important point is that enrichment of the original dextran-salts solutions with a protein derivative such as peptone or casein hydrolysate results in marked stimulation of our endo-dextranase production.

The invention will be more clearly understood from the following examples of the enzymatic splitting of dextran illustrating practical methods of making the new product.

EXAMPLE 1

A portion of the medium obtained from growth of our strain of *Aspergillus wentii* in medium PV (Table 1) was filtered. One cc. of the clear filtrate was added to 110 cc. of fermented sucrose medium containing dextran in a concentration of 7 per cent. The mixture was incubated 3½ hours at room temperature. It was then transferred to a separatory funnel and treated with 50 cc. of acetone, causing the solution to separate into two liquid layers. The lower layer was drawn off and constituted Fraction I of the enzymatically hydrolyzed dextran. To the solution remaining in the funnel was added 25 cc. of acetone, causing the separation of a new lower layer which was drawn off as Fraction II. The addition of 50 cc. more of acetone then caused the separation of Fraction III. Each of the three fractions was treated with alcohol to cause the dextran to precipitate as a white gum.

The products were dried in a vacuum oven at 70° C. to constant weight. There was thus obtained Fraction I = 5.0 gm.; II = 1.5 gm.; and III = 0.5 gm., giving a total recovery of 7 gm. of enzymatically hydrolyzed dextran out of the 7.7 gm. of raw dextran present initially. One percent solutions of the fractions were prepared and the intrinsic viscosities found to be: (where $(n)$ = intrinsic viscosity)

I. $(n) = 0.174$; = 35,000 mol. wt.
II. $(n) = 0.146$; = 24,000 mol. wt.
III. $(n) = 0.137$; = 21,000 mol. wt.

EXAMPLE II

Five cc. of the mold filtrate containing the enzyme prepared as previously noted were added to 1 liter of fermented medium containing dextran in a concentration of 7 per cent. The mixture was incubated at room temperature for five hours and fractionated with acetone in a manner similar to that described previously. There was thus obtained Fraction I = 49 gm. and Fraction II = 13.2 gm., for a recovery of hydrolyzed dextran of 62.2 gm. out of the 70 gm. of raw dextran initially present. By determination of the intrinsic viscosities there were found to correspond to molecular weights of approximately I = 38,000 and II = 24,000.

EXAMPLE III

To 100 cc. of fermented medium containing dextran in a concentration of 7 per cent was added 0.1 cc. of the mold filtrate containing the enzyme. It was incubated at room temperature for 4 hours and then fractionated with acetone to yield Fraction I = 5.9 gm. of molecular weight 69,000 and Fraction II = 0.7 gm. of molecular weight 21,000.

EXAMPLE IV

To 8 liters of fermented medium containing dextran in a concentration of 6.1% was added 80 cc. of the mold filtrate. The viscosity of the mixture was followed at intervals. When the relative viscosity had been reduced to a value of two as determined in a No. 300 Ostwald-Fenske viscometer, the action of the enzyme was stopped by adding alkali to a pH of 10. The time required to reach this value was 40 minutes. The mixture was clarified by treatment with alumina gel following which it was passed through the Sharples centrifuge. The solution was then precipitated with alcohol to a concentration of 55%. The white gum was redissolved in 2 liters of water, treated with Celite, and filtered. The resulting water clear solution was precipitated with alcohol, and the white gum dried to a constant weight in a vacuum oven at 70° C. There was thus obtained 400 grams of a white product with an average molecular weight of 71,000.

Isolation of the enzyme

In the examples referred to above the enzyme was used as it exists in the mold solution. We have found that it is possible to precipitate the enzyme from solution by adding acetone to the clear mold filtrate to yield an acetone concentration in the range of from approximately 35 per cent to 55 per cent and collecting the white precipitate thus obtained. This white powder can be used for splitting the dextran polymer directly by adding it to fermented media containing dextran, or it can be first dissolved in water and then added to the dextran solution. Other methods have been used to isolate the enzyme; for instance, precipitating it with solvents, such as dioxane, or one of the alcohols, in place of acetone. It also has been possible to use ammonium sulfate or sodium sulfate or sodium chloride, for example, to "salt out" the endo-dextranase from the mold filtrate. For example, we have obtained highly potent concentrates of our enzyme by the following method. (a) Filter the medium to remove the mold mat. (b) Add ammonium sulfate at the level of 70 grams per 100 cc. of filtrate, and recover the resulting precipitate. (c) Re-dissolve the dextranase containing precipitate in an amount of water corresponding to approximately one-tenth the original volume of the filtrate in (b). Re-precipitate the enzyme with ammonium sulfate. (d) Repeat this cycle of dissolving the enzyme in water and precipitating it with ammonium sulfate several times, continuing to decrease the volumes of solution involved. (e) Dialyze the final solution to remove extraneous salts. Precipitate the enzyme by adding acetone to a concentration of approximately 70 per cent, and dry the resulting precipitate to obtain the dextranase as a stable, highly potent powder. Alternately, the final dialyzed solution may be freeze-dried to yield the enzyme as a stable, active powder.

Concentration of the enzyme to be employed

In the examples given, the mold filtrate was employed in dilutions ranging from 1:100 to 1:1000 (e. g. 0.1 cc. added to 100 cc.) In other experiments it has been found that a dilution of 1:1000 with time periods from 1 to 5 hours represent satisfactory conditions of operation. However, the mold filtrate is active in dilutions of 1:10,000 and 1:100,000, although the reaction period must then be lengthened accordingly.

When it is desired to stop the enzyme action during the splitting operation, this can be done by making the solution alkaline to a pH of around 9–10. It can also be done by making the solution acid to a pH of around 2–3. In neither event is the acidity nor alkalinity used for reaction or degradation purposes. It is purely for stopping enzymatic action.

Purification of hydrolyzed dextrans

After enzyme action has proceeded to the desired point, the solutions may be purified before fractionation. This can be accomplished as follows: By making the solution approximately 0.1 normal in alkali or acid and heating for a period of 5 to 15 minutes, a flocculent precipitate appears. The solution is then neutralized, a filtration aid such as "Celite" (Johns-Manville) added and the solution filtered, after which it can be fractionated if this is considered necessary. It should be pointed out that if treatment with acid is employed, care should be taken to make the conditions of treatment mild in order that further hydrolysis of the dextran be avoided. Even with this limitation it is more desirable to use acid, since heating in alkaline solution always tends to darken carbohydrates.

An alternate method of purification equally as effective on the hydrolyzed dextran can be followed by treating the enzyme degraded dextran mixture with alumina gel, centrifuging, and precipitating as described in Example IV. Filtration with the use of a filtration aid such as "Celite" then removes all remaining traces of turbidity and water-clear solutions are thus produced.

Advantages in using enzymatic rather than acid hydrolysis for production of split dextrans (a) Dextranose can be readily used directly in the fermented medium containing dextran. In this way it is possible to avoid the expense and trouble of first precipitating the raw dextran with large volumes of a solvent such as alcohol, and then redissolving the dextran before hydrolysis. When acid hydrolysis is employed, it is customary to use this more lengthy procedure. (b) Acid hydrolysis is more difficult to control, and results in products with a wide range of distribution of molecular weights. The conditions of enzyme hydrolysis are mild, yield a white product, and the product has a rather narrow range of molecular sizes—the exact range, of course, depending on the concentration of enzyme and period of hydrolysis chosen.

It will be understood that the following is our informed estimate of what is happening as a matter of theory to which we do not wish to be bound. This enzyme has the capacity of splitting the long chain polymer of different dextrans into portions of a molecular size of desired weights. Apparently this is due to the fact that this enzyme attacks the linkage at the point that would produce severance into desired sized fragments. The exact reason for this, at this moment, we are unaware but is probably due to a requirement of the enzyme for long chains before the dextran and enzyme can combine and react, as described previously. It is our view that when our method and modifications thereof are practiced with other products than dextran and with other enzymes with different dextrans that the molecular splitting may be at different linkage points producing ultimately different molecular weights and different size segments of molecular weight. That this is correct in principle is indicated by the fact that under some change of conditions it is possible, as indicated, to split the long chain dextran polymer in molecular blocks of different sizes than 35,000 weight, but this is a controllable reaction and our method which we desire to cover includes that ability to control the reaction and determine the result.

By controllability we mean that, by adjusting either the time or temperature or both, the degree of degradation of the dextran chain by the enzyme can be regulated to yield the molecular weight range of dextran desired. The pH of the medium during degradation is also influential in speeding up the rate of reaction.

Rules of procedure

The control of the molecular weight is governed by time and temperature; to decrease the molecular weight range of dextran product desired either the time or temperature or both of the enzyme reaction period shall be increased with the limitation that since the enzyme is a protein, care must be taken not to raise the temperature to the point where the enzyme protein will be denatured and hence inactivated. The rate of reaction may also be controlled by the concentration of the enzyme present. The higher the concentration of enzyme the faster the rate of reaction.

The foregoing rules are based upon the assumption that the concentration of enzyme is standard and with a standard rate of reaction the foregoing rules will apply to changes in temperature and in time.

The enzyme concentration is particularly effective over a very wide range. Concentrations up to one part in a thousand, one in ten thousand, one in one hundred thousand and over produce the desired reaction and effect.

We believe there are three principal discoveries in this disclosure:

1. The discovery concerning the addition of an amino acid product to normal mold nutrients for excessive stimulation for enzyme production.

2. The second important discovery is the enzyme itself which has not yet been studied enough but is an adaptive form produced as a result of this mold being cultivated in the presence of dextran. This enzyme so differently produced then possesses characteristics which enable it to attack dextran and reduce its total molecular size.

3. The third discovery is the actual process of producing crude or fermented dextran and adding the enzyme to that fermented dextran and carrying on the molecular weight control following that by precipitation and purification of the dextran to its molecular range size.

We know that the enzyme operates as described herein but we are as yet unaware of the particular reason or reasons for the action of this enzyme and we are as yet without knowledge of its chemical nature other than that it belongs to the class of proteins. It will be understood that when we refer to this enzyme we are using the term generically to include whatever undiscovered chemical therein that brings about this result.

This application is a continuation-in-part of our application Serial No. 232,864, filed June 21, 1951.

It will be understood that we desire to include within our invention such changes as may be necessary to adapt it to varying conditions of use and, therefore, we comprehend within the following claims such modifications.

We claim:

1. In a method of producing dextran of relatively low molecular weight from dextran of relatively high molecular weight, the steps of (a) introducing into an aqueous medium containing the dextran of relatively high molecular weight a "limit" endo-dextranase produced by *Aspergillus wentii*, said "limit" endo-dextranase being characterized in that (1) it initially and preferentially attacks glucosidic linkages deep within the relatively large dextran molecules, (2) it splits the large dextran molecules into segments having a substantially uniform and predeterminable size between the initial size of the large molecules and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln N_r}$$

of an aqueous medium containing the dextran to be split and the endo-dextranase, against the time of action of the endo-dextranase on the dextran, is a curve, and (b) stopping the action of the endo-dextranase on the dextran when the dextran of desired relatively low molecular weight has been produced.

2. The method according to claim 1 characterized in that the endo-dextranase is introduced into the medium containing the dextran to be split in the form of an aqueous solution.

3. The method according to claim 2 characterized in that the aqueous solution is the mold filtrate.

4. The method according to claim 1 characterized in that the endo-dextranase is introduced into the medium containing the dextran to be split in particulate condition.

5. The method according to claim 1 characterized in that the aqueous medium containing the dextran of relatively high molecular weight to be split is the fermentate containing dextran as synthesized by fermentation from sucrose.

6. A method for producing by enzymatic hydrolysis, dextran having a molecular weight of about 69,000 from dextran of higher molecular weight as produced by fermentation in a sucrose-bearing medium which comprises (a) introducing into the fermentate containing, per about 100 parts by volume of the fermentate, about 7% by weight of the high molecular weight dextran, about 0.1 part by volume of mold filtrate containing a "limit" endo-dextranase products by *Aspergillus wentii* and characterized in that (1) it initially and preferentially attacks glucosidic linkages deep within the relatively large dextran molecules, (2) it splits the large dextran molecules into segments having a substantially uniform and predeterminable size between the initial size of the large molecules and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln N_r}$$

of an aqueous medium containing dextran to be split and the endo-dextranase, against the time of action of the endo-dextranase on the dextran, is a curve, (b) incubating the fermentate containing the endo-dextranase for about 4 hours at room temperature, and (c) recovering the dextran of molecular weight about 69,000 from the hydrolyzate.

7. A method for producing by enzymatic hydrolysis, dextran having a molecular weight of about 71,000 from dextran of higher molecular weight as produced by fermentation in a sucrose-bearing medium which comprises (a) introducing into the fermentate containing, per about 1000 parts by volume of the fermentate, about 6.1% by weight of the high molecular weight dextran, about 80 parts by volume of mold filtrate containing a "limit" endo-dextranase produced by *Aspergillus wentii* and characterized in that (1) it initially and preferentially attacks glucosidic linkages deep within the relatively large dextran molecules, (2) it splits the large dextran molecules into segments having a substantially uniform and predeterminable size between the initial size of the large molecules and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln N_r}$$

of an aqueous medium containing dextran to be split and the endo-dextranase, against the time of action of the endo-dextranease on the dextran, is a curve, (b) incubating the fermentate containing the endo-dextranase for about 40 minutes at room temperature, and (c) recovering the dextran having a molecular weight of about 71,000 from the hydrolyzate.

8. A "limit" endo-dextranase produced by *Aspergillus wentii* and characterized in that (1) it initially and preferentially attacks glucosidic linkages deep within the relatively large dextran molecules, (2) it splits the large dextran molecules into segments having a substantially uniform and predeterminable size between the initial size of the large molecule and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln N_r}$$

of an aqueous medium containing dextran to be split and the endo-dextranase, against the time of action of the endo-dextranase on the dextran, is a curve.

9. A mold filtrate comprising a "limit" endo-dextranase produced by *Aspergillus wentii* and characterized in that (1) it initially and preferentially attacks glucosidic linkages deep within the relatively large dextran molecules, (2) it splits the large dextran molecules into segments having a substantially uniform and predeterminable size between the initial size of the large molecule and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln N_r}$$

of an aqueous medium containing dextran to be split and the endo-dextranase, against the time of action of the endo-dextranase on the dextran, is a curve.

10. A particulate material comprising a "limit" endo-dextranase produced by *Aspergillus wentii* and characterized in that (1) it initially and preferentially attacks glucosidic linkages deep within the relatively large dextran molecules, (2) it splits the large dextran molecules into segments having a substantially uniform and predeterminable size between the initial size of the large molecule and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln Nr}$$

of an aqueous medium containing dextran to be split and the endo-dextranase, against the time of action of the endo-dextranase on the dextran, is a curve.

11. An aqueous solution of a "limit" endo-dextranase produced by *Aspergillus wentii* and precipitated from the mold filtrate, said endo-dextranase being characterized in that (1) it initially and preferentially attacks glucosidic linkages deep within the relatively large dextran molecules, (2) it splits the large dextran molecules into segments having a substantially uniform and predeterminable size between the initial size of the large molecule and a smaller size corresponding to a molecular weight not appreciably lower than about 20,000, (3) it exhibits little capacity to split the dextran into segments of molecular weight substantially lower than about 20,000, and (4) the plot of the reciprocal of the natural logarithm of the relative viscosity $$\frac{1}{\ln Nr}$$

of an aqueous medium containing dextran to be split and the endo-dextranase, against the time of action of the endo-dextranase on the dextran, is a curve.

12. A method of producing blood plasma extender dextran from dextran of molecular weight higher than the permissible extender range which comprises (*a*) introducing into an aqueous medium containing the high molecular weight dextran a "limit" endo-dextranase produced by an *Aspergillus wentii*, said "limit" endo-dextranase being characterized in that (1) it initially and preferentially attacks glucosidic linkages deep within the relatively large dextran molecules, (2) it splits the large dextran molecules into segments having a substantially uniform and predeterminable size between the initial size of the large molecules and a smaller size corresponding to a molecular weight not appreciably lower than about 20,000, (3) it exhibits little capacity to split the dextran into segments of molecular weight substantially lower than about 20,000, and (4) the plot of the natural logarithm of the relative viscosity $$\frac{1}{\ln Nr}$$

of an aqueous medium containing dextran to be split and the "limit" endo-dextranase against the time of action of the "limit" endo-dextranase on the dextran is non-linear, (*b*) stopping the action of the "limit" endo-dextranase on the dextran when the blood plasma extender dextran has been produced, and (*c*) separating the blood plasma extender dextran from the medium.

13. The method according to claim 12, characterized in that the "limit" endo-dextranase is produced from *Aspergillus wentii* and introduced into a fermentate containing native dextran produced by fermentation in a sucrose-bearing medium.

References Cited in the file of this patent

Chem. Abst. 43: 4307(*g*), Enzymatic breakdown of dextran, Ingleman, (1940).

Chem. Abst. 44: 7382(*g*), Investigations on dextranase. Hultin et al.

Tauber, Chemistry and Technology of Enzymes, John Wiley & Sons, Inc., 1949, pages 401–407.

Sumner et al., Enzymes, Academic Press, 1943, page 36.

Evan's Advances in Carbohydrate Chemistry, 1947, vol. II, pages 210–11.

Tauber, Enzyme Technology, Wiley, 1947, page 122.

Chemical Abstract 43: 3050(*i*) (1948).

Foster, Chemical Activities of Fungi, Academic Press, 1949, pages 493, 494.